United States Patent
Liu et al.

(10) Patent No.: US 10,440,720 B2
(45) Date of Patent: Oct. 8, 2019

(54) CO-CHANNEL INTERFERENCE CANCELLATION METHOD AND APPARATUS

(71) Applicant: Huawei Technologies Co., Ltd., Shenzhen (CN)

(72) Inventors: Qiao Liu, Chengdu (CN); Xiaodong Li, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/963,672

(22) Filed: Apr. 26, 2018

(65) Prior Publication Data

US 2018/0249472 A1   Aug. 30, 2018

Related U.S. Application Data

(63) Continuation of application No. PCT/CN2015/092978, filed on Oct. 27, 2015.

(51) Int. Cl.
*H04B 15/00* (2006.01)
*H04W 72/08* (2009.01)
(Continued)

(52) U.S. Cl.
CPC ........ *H04W 72/082* (2013.01); *H04B 1/1081* (2013.01); *H04B 1/123* (2013.01);
(Continued)

(58) Field of Classification Search
CPC ...... H04B 1/525; H04B 1/123; H04B 1/1081; H04L 25/0204; H04L 25/0328; H04W 72/082; H04W 28/04
See application file for complete search history.

(56) References Cited

U.S. PATENT DOCUMENTS 6,519,457 B1   2/2003   Jiang et al.
6,714,609 B1 *  3/2004   Keisala .................. H04B 1/123
                                                        375/349

(Continued)

FOREIGN PATENT DOCUMENTS

CN            1874189 A    12/2006
CN            1874190 A    12/2006
WO       2004107596 A1    12/2004

*Primary Examiner* — Nhan T Le
(74) *Attorney, Agent, or Firm* — Leydig, Voit & Mayer, Ltd.

(57) ABSTRACT

A co-channel interference cancellation method and apparatus are provided. The method includes: obtaining effective interference by filtering co-channel interference according to a preset interference strength threshold, and obtaining a plurality of effective interference subgroups by grouping the effective interference; obtaining a reference interference sub-signal corresponding to the effective interference subgroup, by delaying a reference interference signal according to a determined interference delay of each effective interference subgroup; after each reference interference sub-signal passes through a corresponding adaptive interference reconstruction filter, obtaining a reconstructed interference signal by overlaying each reference interference sub-signal; and performing a subtraction operation on a received signal and the reconstructed interference signal. In this way, spectrum consumption is greatly reduced, and implementation is simple.

15 Claims, 9 Drawing Sheets

(51) Int. Cl.
*H04W 28/04* (2009.01)
*H04B 1/12* (2006.01)
*H04B 1/525* (2015.01)
*H04B 1/10* (2006.01)
*H04L 25/03* (2006.01)
*H04L 25/02* (2006.01)

(52) U.S. Cl.
CPC ......... *H04B 1/525* (2013.01); *H04L 25/0328* (2013.01); *H04W 28/04* (2013.01); *H04L 25/0204* (2013.01)

(56) References Cited

U.S. PATENT DOCUMENTS

| | | | |
|---|---|---|---|
| 7,092,452 B2 * | 8/2006 | Taylor | H04B 1/7105 375/267 |
| 8,929,322 B1 * | 1/2015 | Kludt | H04W 72/085 342/379 |
| 9,065,519 B2 * | 6/2015 | Cyzs | H04B 1/126 |
| 9,713,010 B2 * | 7/2017 | Khandani | H04W 16/14 |
| 10,284,356 B2 * | 5/2019 | Bharadia | H04L 5/1461 |
| 2015/0103802 A1 | 4/2015 | Cheng et al. | |
| 2015/0180640 A1 | 6/2015 | Liu et al. | |

* cited by examiner

CO-CHANNEL INTERFERENCE CANCELLATION METHOD AND APPARATUS

CROSS-REFERENCE TO RELATED APPLICATIONS

This application is a continuation of International Application No. PCT/CN2015/092978, filed on Oct. 27, 2015, the disclosure of which is hereby incorporated by reference in its entirety.

TECHNICAL FIELD

Embodiments of the present invention relate to the field of interference cancellation technologies, and specifically, to a co-channel interference cancellation method and apparatus.

BACKGROUND

A FD (Full Duplex) technology allows signal sending and receiving to be simultaneously performed by using carriers with a same frequency. The full duplex technology is a combination of advantages of a TDD (Time Division Duplexing) technology and a FDD (Frequency Division Duplexing) technology, and theoretically, can double spectrum utilization. However, in actual application, when the full duplex technology is used, relatively high co-channel interference is generated by a transmit antenna and a receive antenna. The co-channel interference includes near-end interference and far-end transmission interference. The near-end interference is caused by a local-end transmit antenna on a local-end receive antenna. The far-end interference is caused after a signal sent by a local-end transmit antenna is reflected when being blocked by an obstacle and is received by the local-end receive antenna. A channel of the near-end interference and a channel of the far-end transmission interference form an overall interference channel of a full duplex system. The overall interference channel has features that a channel length is large and interference signal energy is mainly centralized near each reflection point. As shown in FIG. 1, FIG. 1 is a schematic diagram of a scenario in which a transmit antenna and a receive antenna generate co-channel interference according to the conventional art. A station A is used as an example. A signal received by a receive antenna of the station A is $r=S_1 I^* h_{1,0} + I^* h_{1,1} + I^* h_{1,2} + \ldots + I^* h_{1,M}$. $h_{1,0}$ is an interference channel of near-end interference, $h_{1,1}, h_{1,2}, \ldots, h_{1,M}$ respectively indicate channels of far-end transmission interference, and $*$ indicates a convolution. Each sub-interference channel is a multipath interference channel, that is, $h_{1,i} = [h_{1,i,0}, h_{1,i,1}, h_{1,i,2}, \ldots, h_{1,i,N}]$, and $i=0, 1, 2, \ldots, M$. $S_1$ is a wanted signal, and I indicates an interference signal sent by a local-end transmit antenna. To ensure reliable sending and receiving of signals, co-channel interference cancellation is a key point of the full duplex technology.

Currently, co-channel interference cancellation solutions are as follows: 1. An estimated value of an overall interference channel is obtained by performing estimation on the overall interference channel, and then filtering processing is performed on a reference interference signal by using the estimated value as a filter coefficient, so as to restore an equi-amplitude phase-inverted signal of a received interference signal. In this solution, to obtain the estimated value of the overall interference channel through estimation, a sent sequence length used for the estimation of the overall interference channel is at least greater than a length of the overall interference channel. Spectrum overheads are high, and spectrum utilization is greatly reduced. 2. A frequency domain balancing solution: In this solution, to balance an overall interference channel with a large channel length, a protection interval length that needs to be inserted is at least of a channel length magnitude. Spectrum overheads are high, and spectrum utilization is greatly reduced. It can be learned that, the spectrum overheads are high in the current co-channel interference cancellation solutions.

SUMMARY

Embodiments of the present invention disclose a co-channel interference cancellation method and apparatus, so as to cancel co-channel interference and reduce spectrum overheads.

A first aspect of the embodiments of the present invention discloses a co-channel interference cancellation method, and the method includes:

obtaining effective interference by filtering co-channel interference according to a preset interference strength threshold, and obtaining a plurality of effective interference subgroups by grouping the effective interference;

obtaining a reference interference sub-signal corresponding to the effective interference subgroup, by delaying a reference interference signal according to a determined interference delay of each effective interference subgroup;

after each reference interference sub-signal passes through a corresponding adaptive interference reconstruction filter, obtaining a reconstructed interference signal by overlaying each reference interference sub-signal; and obtaining a first wanted signal by performing a subtraction operation on a received signal and the reconstructed interference signal.

In a first possible implementation of the first aspect of the embodiments of the present invention, the obtaining effective interference by filtering co-channel interference according to a preset interference strength threshold includes:

determining, as the effective interference, co-channel interference obtained after an interference strength value of first target interference in the co-channel interference is set to zero, where the first target interference is interference that is in the co-channel interference and whose interference strength value is less than or equal to the preset interference strength threshold.

With reference to the first aspect of the embodiments of the present invention or the first possible implementation of the first aspect of the embodiments of the present invention, in a second possible implementation of the first aspect of the embodiments of the present invention, before the obtaining effective interference by filtering co-channel interference according to a preset interference strength threshold, the method further includes:

determining a reference delay of the co-channel interference, where the reference delay is a counting result of counting from a first symbol that is used to send a preamble of the reference interference signal, until strongest interference with a maximum interference strength value is received, where an interference delay of each effective interference subgroup is equal to a sum of a delay difference of the effective interference subgroup and the reference delay, and a delay difference of each effective interference subgroup is equal to a difference between a relative delay of the effective interference subgroup and a related delay of the strongest interference.

With reference to the first possible implementation of the first aspect of the embodiments of the present invention, in a third possible implementation of the first aspect of the embodiments of the present invention, the obtaining a plurality of effective interference subgroups by grouping the effective interference includes:

determining second target interference in a target range interference as an effective interference subgroup, where the target range interference includes all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing an operation of determining the second target interference in the target range interference as an effective interference subgroup until the effective interference is grouped into a plurality of effective interference subgroups.

With reference to the first aspect of the embodiments of the present invention, the first possible implementation of the first aspect of the embodiments of the present invention, the second possible implementation of the first aspect of the embodiments of the present invention, or the third possible implementation of the first aspect of the embodiments of the present invention, in a fourth possible implementation of the first aspect of the embodiments of the present invention, the method further includes:

obtaining a second wanted signal by performing decision on the first wanted signal;

calculating a difference between the first wanted signal and the second wanted signal; and updating, according to the difference, a filter coefficient that is of the adaptive interference reconstruction filter and that is corresponding to each reference interference sub-signal.

A second aspect of the embodiments of the present invention discloses a co-channel interference cancellation apparatus, where the apparatus includes a filtering module, a grouping module, a delay module, a reconstruction module, and a cancellation module, where the filtering module is configured to obtain effective interference by filtering co-channel interference according to a preset interference strength threshold;

the grouping module is configured to obtain a plurality of effective interference subgroups by grouping the effective interference;

the delay module is configured to obtain a reference interference sub-signal corresponding to the effective interference subgroup, by delaying a reference interference signal according to a determined interference delay of each effective interference subgroup;

the reconstruction module is configured to: after each reference interference sub-signal passes through a corresponding adaptive interference reconstruction filter, obtain a reconstructed interference signal by overlaying each reference interference sub-signal; and the cancellation module is configured to obtain a first wanted signal by performing a subtraction operation on a received signal and the reconstructed interference signal.

In a first possible implementation of the second aspect of the embodiments of the present invention, a specific manner in which the filtering module obtains the effective interference by filtering the co-channel interference according to the preset interference strength threshold is:

determining, as the effective interference, co-channel interference obtained after an interference strength value of first target interference in the co-channel interference is set to zero.

With reference to the second aspect of the embodiments of the present invention or the first possible implementation of the second aspect of the embodiments of the present invention, in a second possible implementation of the second aspect of the embodiments of the present invention, the apparatus further includes a determining module, where the determining module is configured to determine a reference delay of the co-channel interference before the filtering module obtains the effective interference by filtering the co-channel interference according to the preset interference strength threshold, where the reference delay is a counting result of counting from a first symbol that is used to send a preamble of the reference interference signal, until strongest interference with a maximum interference strength value is received, where an interference delay of each effective interference subgroup is equal to a sum of a delay difference of the effective interference subgroup and the reference delay, and a delay difference of each effective interference subgroup is equal to a difference between a relative delay of the effective interference subgroup and a related delay of the strongest interference.

With reference to the first possible implementation of the second aspect of the embodiments of the present invention, in a third possible implementation of the second aspect of the embodiments of the present invention, a specific manner in which the grouping module obtains the plurality of effective interference subgroups by grouping the effective interference is:

determining second target interference in a target range interference as an effective interference subgroup, where the target range interference includes all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing an operation of determining the second target interference in the target range interference as an effective interference subgroup until the effective interference is grouped into a plurality of effective interference subgroups.

With reference to the second aspect of the embodiments of the present invention, the first possible implementation of the second aspect of the embodiments of the present invention, the second possible implementation of the second aspect of the embodiments of the present invention, or the third possible implementation of the second aspect of the embodiments of the present invention, in a fourth possible implementation of the second aspect of the embodiments of the present invention, the apparatus further includes a calculation module, a decision module, and an updating module, where:

the decision module is configured to obtain a second wanted signal by performing decision on the first wanted signal;

the calculation module is configured to calculate a difference between the first wanted signal and the second wanted signal; and the updating module is configured to update, according to the difference, a filter coefficient that is of the adaptive interference reconstruction filter and that is corresponding to each reference interference sub-signal.

A third aspect of the embodiments of the present invention discloses a co-channel interference cancellation apparatus, where the apparatus includes a memory and a processor, the memory stores a group of program code, and the processor is configured to invoke the program code stored in the memory to perform the following operations:

obtaining effective interference by filtering co-channel interference according to a preset interference strength threshold, and obtaining a plurality of effective interference subgroups by grouping the effective interference;

obtaining a reference interference sub-signal corresponding to the effective interference subgroup, by delaying a reference interference signal according to a determined interference delay of each effective interference subgroup;

after each reference interference sub-signal passes through a corresponding adaptive interference reconstruction filter, obtaining a reconstructed interference signal by overlaying each reference interference sub-signal; and obtaining a first wanted signal by performing a subtraction operation on a received signal and the reconstructed interference signal.

In a first possible implementation of the third aspect of the embodiments of the present invention, a specific manner in which the processor obtains the effective interference by filtering the interference according to the preset interference strength threshold is:

determining, as the effective interference, co-channel interference obtained after an interference strength value of first target interference in the co-channel interference is set to zero, where the first target interference is interference that is in the co-channel interference and whose interference strength value is less than or equal to the preset interference strength threshold.

With reference to the third aspect of the embodiments of the present invention or the first possible implementation of the third aspect of the embodiments of the present invention, in a second possible implementation of the third aspect of the embodiments of the present invention, before the processor obtains the effective interference by filtering the co-channel interference according to the preset interference strength threshold, the processor invokes the program code stored in the memory to further perform the following operation:

determining a reference delay of the co-channel interference, where the reference delay is a counting result of counting from a first symbol that is used to send a preamble of the reference interference signal, until strongest interference with a maximum interference strength value is received, where an interference delay of each effective interference subgroup is equal to a sum of a delay difference of the effective interference subgroup and the reference delay, and a delay difference of each effective interference subgroup is equal to a difference between a relative delay of the effective interference subgroup and a related delay of the strongest interference.

With reference to the first possible implementation of the third aspect of the embodiments of the present invention, in a third possible implementation of the third aspect of the embodiments of the present invention, a specific manner in which the processor obtains the plurality of effective interference subgroups by grouping the effective interference is:

determining second target interference in a target range interference as an effective interference subgroup, where the target range interference includes all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing an operation of determining the second target interference in the target range interference as an effective interference subgroup until the effective interference is grouped into a plurality of effective interference subgroups.

With reference to the third aspect of the embodiments of the present invention, the first possible implementation of the third aspect of the embodiments of the present invention, the second possible implementation of the third aspect of the embodiments of the present invention, or the third possible implementation of the third aspect of the embodiments of the present invention, in a fourth possible implementation of the third aspect of the embodiments of the present invention, the processor invokes the program code stored in the memory to further perform the following operations:

obtaining a second wanted signal by performing decision on the first wanted signal;

calculating a difference between the first wanted signal and the second wanted signal; and updating, according to the difference, a filter coefficient that is of the adaptive interference reconstruction filter and that is corresponding to each reference interference sub-signal.

In the embodiments of the present invention, effective interference is obtained by filtering co-channel interference according to a preset interference strength threshold, and a plurality of effective interference subgroups are obtained by grouping the effective interference; a reference interference sub-signal corresponding to the effective interference subgroup is obtained by delaying a reference interference signal according to a determined interference delay of each effective interference subgroup; after each reference interference sub-signal passes through a corresponding adaptive interference reconstruction filter, a reconstructed interference signal is obtained by overlaying each reference interference sub-signal; and a first wanted signal is obtained by performing a subtraction operation on a received signal and the reconstructed interference signal. It can be learned that, in the embodiments of the present invention, a plurality of ineffective interference may be canceled by using a preset interference strength threshold, and effective interference obtained after the ineffective interference is canceled is grouped into a plurality of effective interference subgroups, that is, a channel with a large channel length is divided into a plurality of sub-channels with a relatively short channel length, and a same operation is performed on each sub-channel. In this way, spectrum consumption is greatly reduced, and implementation is simple.

BRIEF DESCRIPTION OF DRAWINGS

To describe the technical solutions in the embodiments of the present invention or in the conventional art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a co-channel interference cancellation method and apparatus, so as to cancel co-channel interference and reduce spectrum overheads, and implementation is simple. Details are separately described below.

Figure 1:
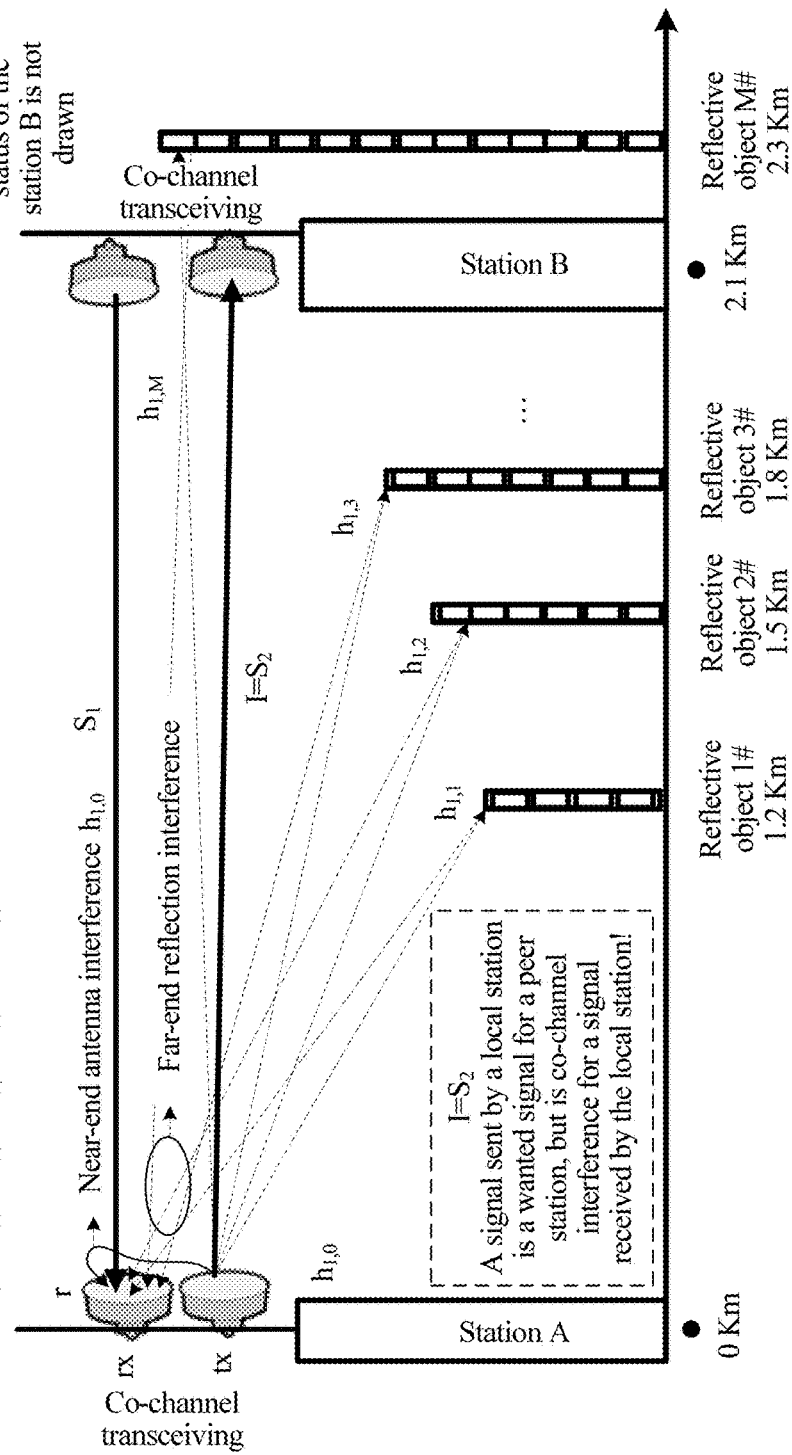
FIG. 1 is a schematic diagram of a scenario in which a transmit antenna and a receive antenna generate co-channel interference according to the conventional art.
Figure 2:
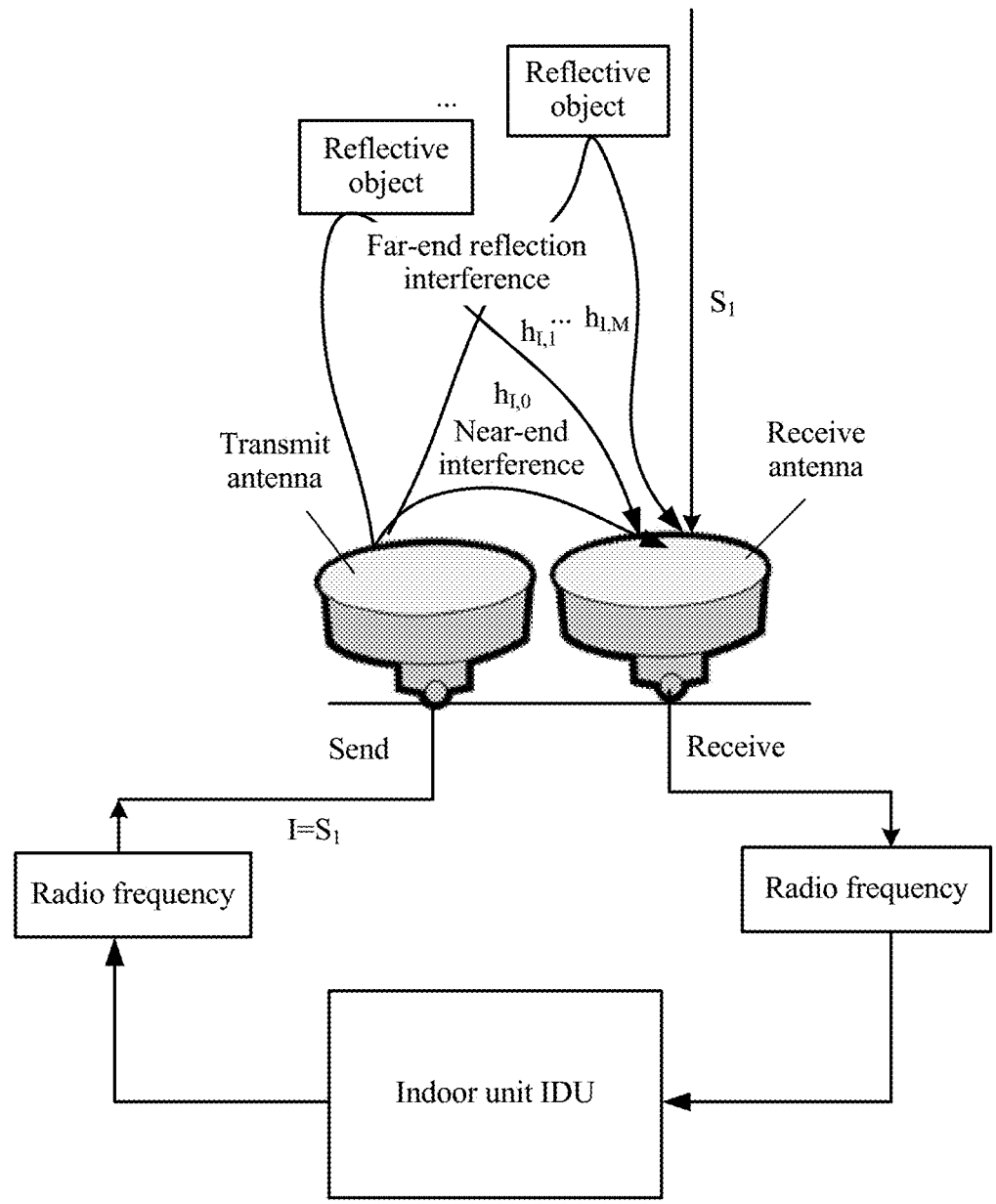
FIG. 2 is a schematic diagram of an application architecture disclosed in an embodiment of the present invention.

To better understand a co-channel interference cancellation method and apparatus disclosed in the embodiments of the present invention, the following first describes an application architecture that is applicable to the embodiments of the present invention. Referring to FIG. 2, FIG. 2 is a schematic diagram of an architecture of an application architecture disclosed in an embodiment of the present invention. As shown in FIG. 2, the application architecture may include a transmit antenna, a receive antenna, and an IDU (Indoor Unit). The indoor unit IDU is configured to: after performing processing such as quadrature amplitude modulation and digital-to-analog conversion on a wanted signal that needs to be sent, transmit the wanted signal by using the transmit antenna; and obtain a wanted signal after performing processing such as analog-to-digital conversion and co-channel interference cancellation on a received signal of the receive antenna. The received signal received by the receive antenna includes a wanted signal sent by a peer-end transmit antenna and a co-channel interference signal brought by a wanted signal sent by a local-end transmit antenna. The co-channel interference signal includes a near-end interference signal that is directly caused by the wanted signal transmitted by the local-end transmit antenna on a local-end receive antenna, and a far-end transmission interference signal that reflects back after the wanted signal transmitted by the local-end transmit antenna is blocked by an obstacle. It should be noted that the co-channel interference cancellation method in the present invention may further be applied to another wireless or wired application scenario or application architecture that has in-band co-channel interference.

Figure 3:
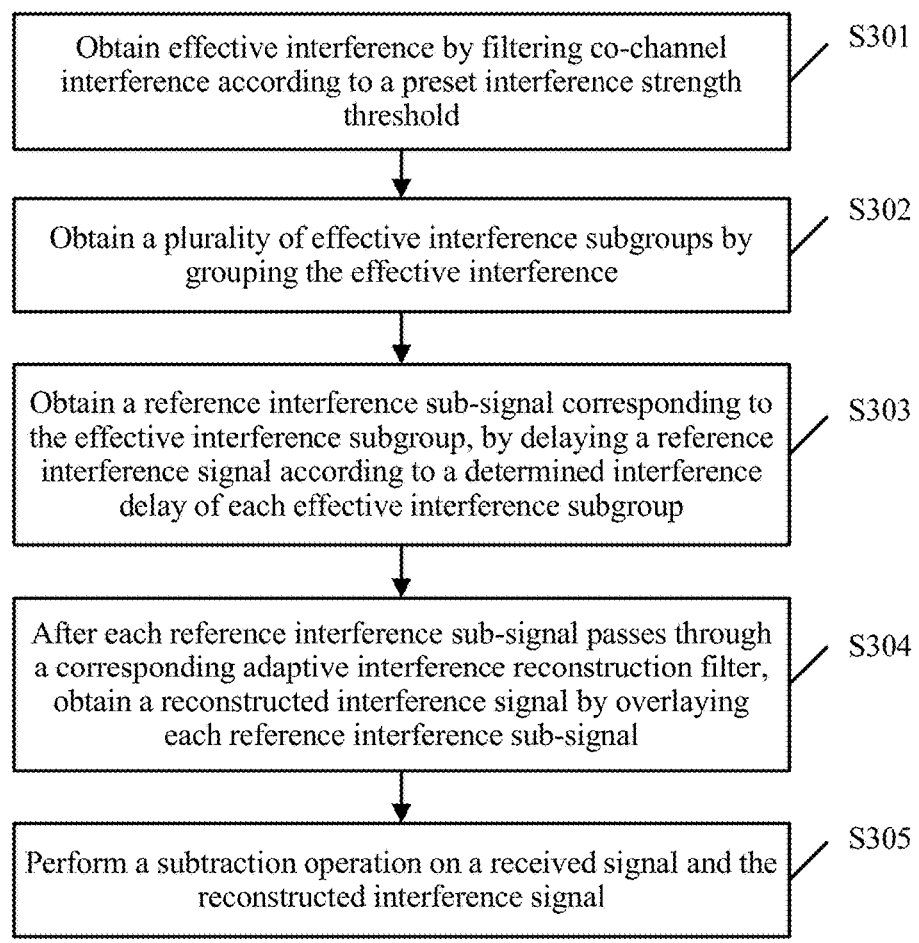
FIG. 3 is a schematic flowchart of a co-channel interference cancellation method disclosed in an embodiment of the present invention.

Referring to FIG. 3, FIG. 3 is a schematic flowchart of a co-channel interference cancellation method disclosed in an embodiment of the present invention. As shown in FIG. 3, the co-channel interference cancellation method may include the following steps.

S301. Obtain effective interference by filtering co-channel interference according to a preset interference strength threshold.

In this embodiment of the present invention, the co-channel interference includes a plurality of sub-interference (including near-end interference and a plurality of far-end transmission interference). Each sub-interference is multipath interference, and other interference with an extremely small interference strength value exists between two adjacent sub-interference. Energy of sub-interference caused by a reflective object is mainly centralized near a reflection point. Tailing interference and false interference of each sub-interference may be filtered by using the preset interference strength threshold. A smaller interference strength threshold indicates a higher co-channel interference cancellation accuracy.

S302. Obtain a plurality of effective interference subgroups by grouping the effective interference.

S303. Obtain a reference interference sub-signal corresponding to the effective interference subgroup, by delaying a reference interference signal according to a determined interference delay of each effective interference subgroup.

In this embodiment of the present invention, each effective interference subgroup is corresponding to one interference delay t_hl,i, where i includes all integers that are greater than or equal to 0 and that are less than or equal to N, and N is a quantity of the plurality of effective interference subgroups. The reference interference signal is separately delayed in parallel by the interference delay of each effective interference subgroup, so as to obtain the reference interference sub-signal corresponding to the effective interference subgroup.

S304. After each reference interference sub-signal passes through a corresponding adaptive interference reconstruction filter, obtain a reconstructed interference signal by overlaying each reference interference sub-signal.

In this embodiment of the present invention, the reference interference sub-signal corresponding to each effective interference subgroup passes through the corresponding adaptive interference reconstruction filter, and outputs of different adaptive interference reconstruction filters are overlaid to obtain the reconstructed interference signal.

S305. Perform a subtraction operation on a received signal and the reconstructed interference signal.

In this embodiment of the present invention, a subtraction operation is performed on the reconstructed interference signal and the received signal that is received by the receive antenna and on which an analog-to-digital conversion is performed, so as to cancel interference in the received signal to obtain a first wanted signal.

In an optional implementation, the obtaining effective interference by filtering co-channel interference according to a preset interference strength threshold may include:

determining, as the effective interference, co-channel interference obtained after an interference strength value of first target interference in the co-channel interference is set to zero, where the first target interference is interference that is in the co-channel interference and whose interference strength value is less than or equal to the preset interference strength threshold.

In this optional implementation, further and optionally, the obtaining a plurality of effective interference subgroups by grouping the effective interference may include:

determining second target interference in a target range interference as an effective interference subgroup, where the target range interference includes all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing an operation of determining the second target interference in the target range interference as an effective interference subgroup until the effective interference is grouped into a plurality of effective interference subgroups.

Specifically, it is started from first multipath sub-interference whose interference strength value is greater than zero and that is of a first sub-interference in the foregoing effective interference, if multipath sub-interference whose quantity is greater than the preset quantity and whose interference strength value is zero appears, interference before the multipath sub-interference whose quantity is greater than the preset quantity and whose interference strength value is zero is determined as a first effective interference subgroup. Then, the foregoing operation is repeated from a first multipath sub-interference whose interference strength value is greater than zero and that is after the multipath sub-interference whose quantity is greater than the preset quantity and whose interference strength value is zero, until all the foregoing effective interference is grouped.

In another optional embodiment, before step S301 is performed, the following operations may be further performed:

determining a reference delay C of the co-channel interference, where the reference delay C is a counting result of counting from a first symbol that is used to send a preamble of the reference interference signal (that is, a signal that needs to be transmitted by a signal source in an indoor unit IDU), until strongest interference with a maximum interference strength value is received, that is, the reference delay of the co-channel interference is an absolute delay from sending of the strongest interference to receiving of the strongest interference.

The interference delay $t\_hl,i$ of each effective interference subgroup is equal to a sum of a delay difference of the effective interference subgroup and the reference delay C. The delay difference of each effective interference subgroup is equal to a difference between a relative delay $ni$ of the effective interference subgroup and a related delay $nc$ of the strongest interference. The relative delay $ni$ of each effective interference subgroup is equal to a related delay of intermediate interference of the effective interference subgroup.

In still another optional implementation, after step S305 is completed, the following operations may be further performed:

obtaining a second wanted signal by performing decision on the first wanted signal;

calculating a difference between the first wanted signal and the second wanted signal; and updating, according to the difference, a filter coefficient that is of the adaptive interference reconstruction filter and that is corresponding to each reference interference sub-signal.

In still another optional implementation, the co-channel interference is reconstructed by using the adaptive interference reconstruction filter, and the coefficient of the adaptive interference reconstruction filter is updated according to a difference between the first interference signal and the second interference signal. In this way, co-channel interference with a large channel length can be adaptively canceled, and a co-channel interference cancellation accuracy can be improved.

Figure 8A:
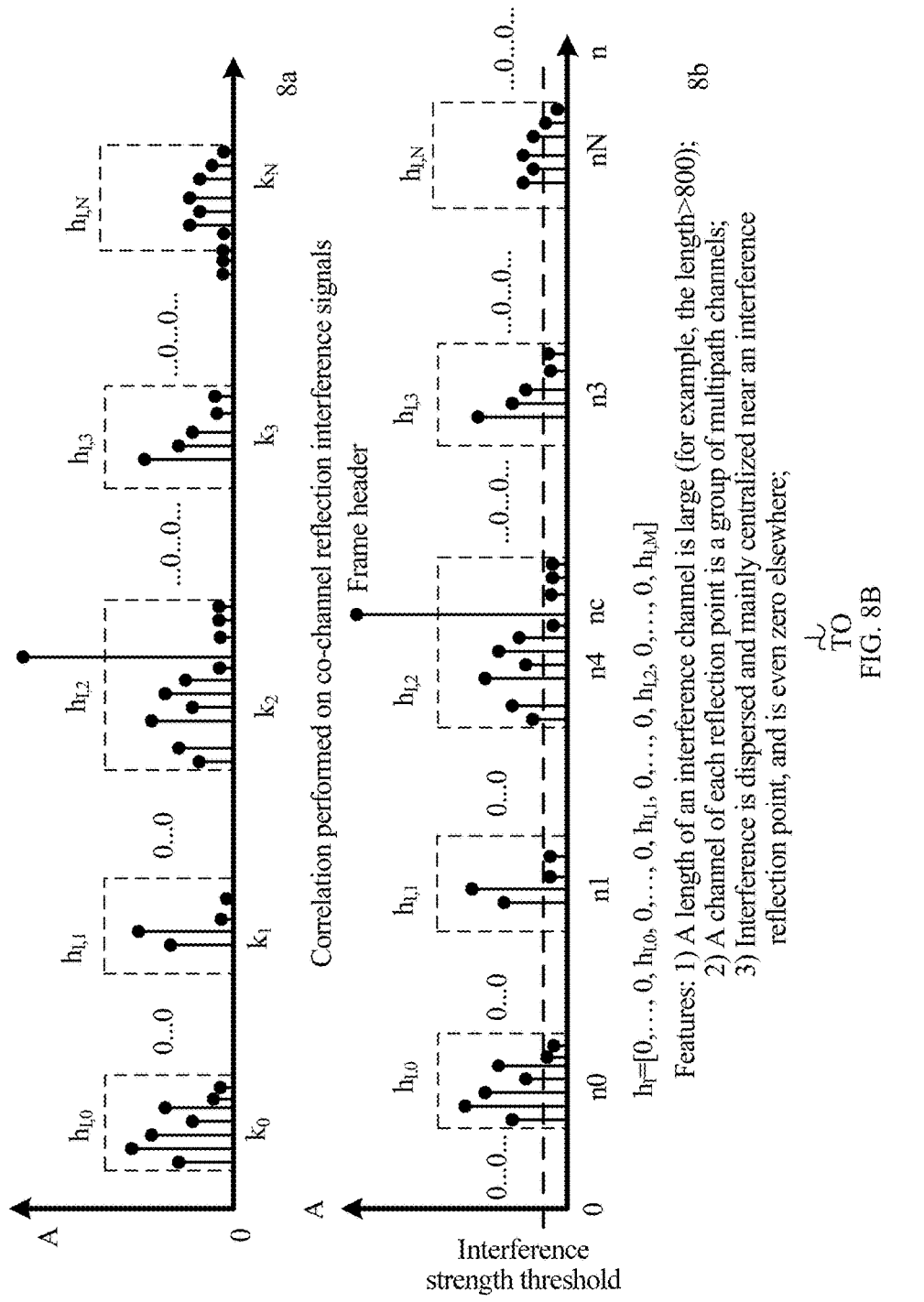
FIG. 8A and FIG. 8B are a schematic diagram of formation of an effective interference subgroup disclosed in an embodiment of the present invention.
Figure 8B:
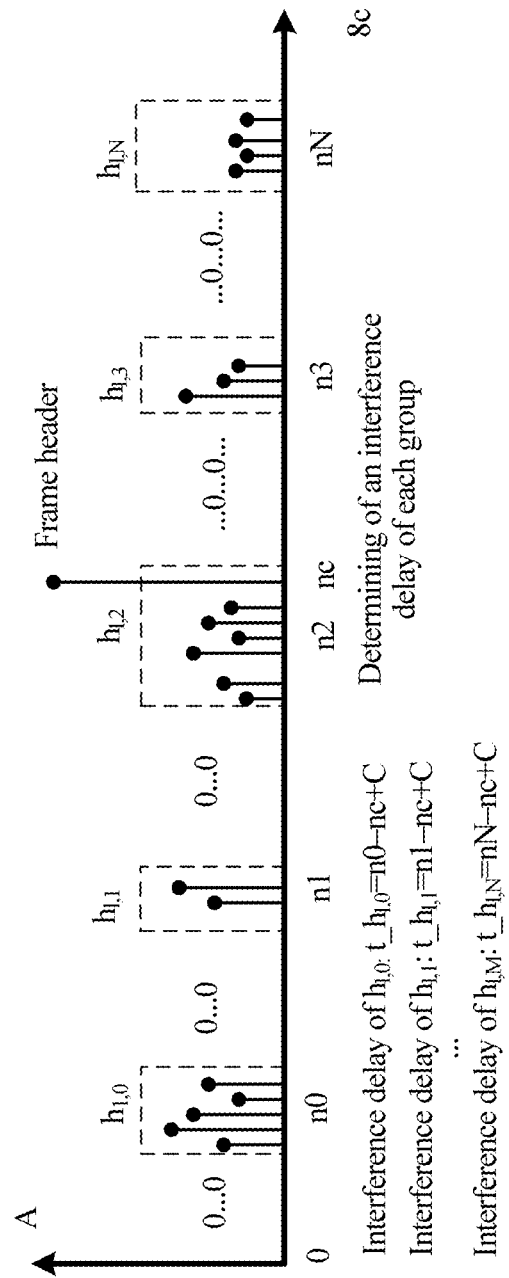

In this embodiment of the present invention, a formation process of the effective interference subgroup may be shown in FIG. 8A and FIG. 8B. FIG. 8A and FIG. 8B are a schematic diagram of formation of an effective interference subgroup disclosed in an embodiment of the present invention. As shown in FIG. 8A and FIG. 8B, 8a in FIG. 8A and FIG. 8B shows co-channel interference that includes a plurality of sub-interference, and each sub-interference is multipath sub-interference. Sub-interference with an extremely small (almost zero) interference strength value exists between adjacent sub-interference. 8b in FIG. 8A and FIG. 8B shows filtering performed on the co-channel interference in 8a by using an interference strength threshold, and an interference strength value that is of multipath sub-interference and that is less than or equal to the interference strength threshold is set to 0. 8c in FIG. 8A and FIG. 8B shows N effective interference subgroups obtained by dividing effective interference obtained after the co-channel interference is filtered.

In this embodiment of the present invention, the effective interference is obtained by filtering the co-channel interference according to the preset interference strength threshold, and the plurality of effective interference subgroups are obtained by grouping the effective interference; the reference interference sub-signal corresponding to the effective interference subgroup is obtained by delaying the reference interference signal according to the determined interference delay of each effective interference subgroup; after each reference interference sub-signal passes through the corresponding adaptive interference reconstruction filter, the reconstructed interference signal is obtained by overlaying each reference interference sub-signal; and the subtraction operation is performed on the received signal and the reconstructed interference signal. It can be learned that, in this embodiment of the present invention, a plurality of ineffective interference may be canceled by using the preset interference strength threshold, and the effective interference obtained after the ineffective interference is canceled is grouped into the plurality of effective interference subgroups, that is, a channel with a large channel length is divided into a plurality of sub-channels with a relatively short channel length, and a same operation is performed on each sub-channel. In this way, spectrum consumption is greatly reduced, implementation is simple and interference brought by channels with different channel lengths can be adaptively canceled, and a requirement on an estimation accuracy of the interference delay of each effective interference subgroup is not high.

Figure 4A:
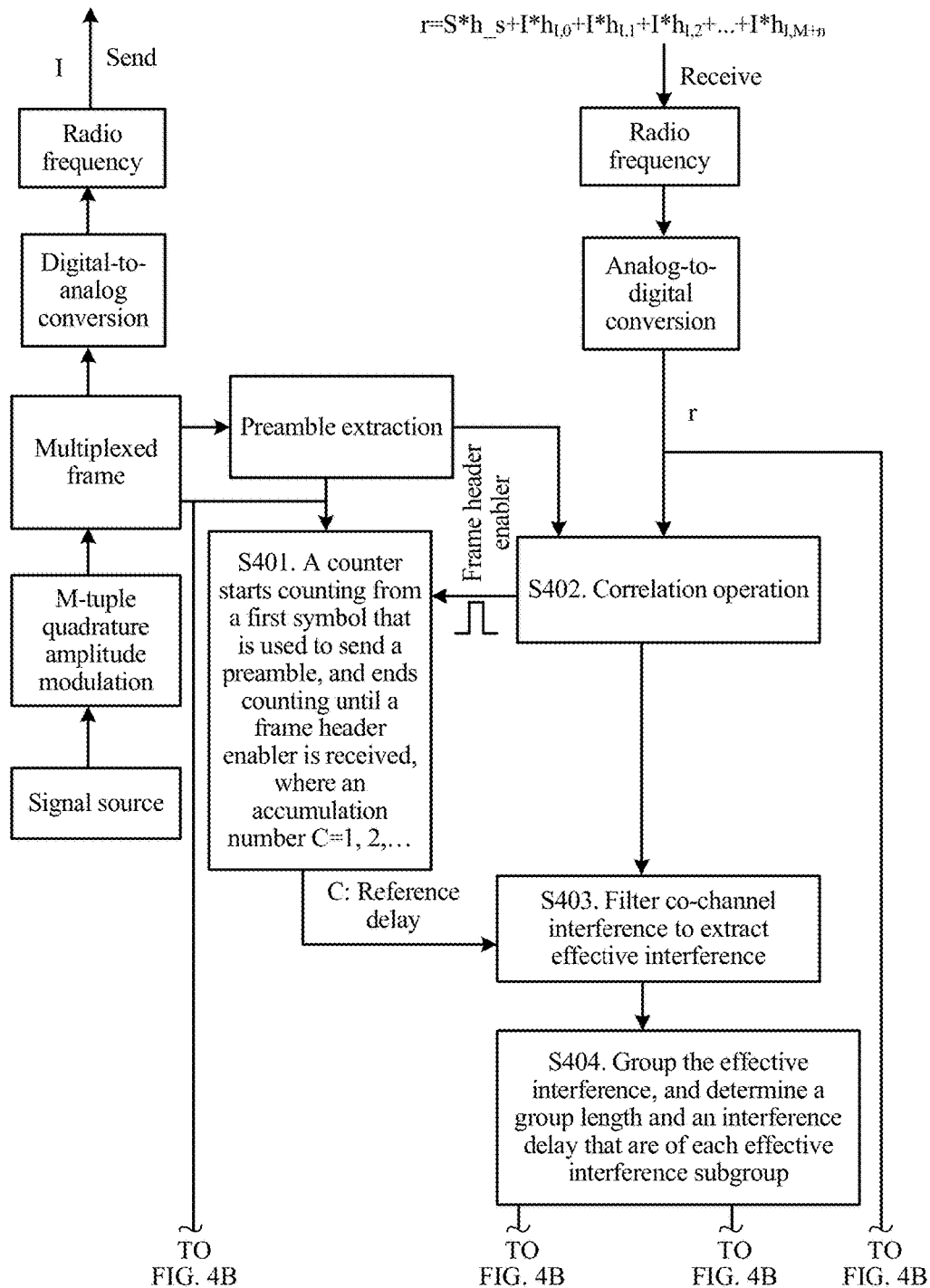
FIG. 4A and FIG. 4B are a schematic flowchart of another co-channel interference cancellation method disclosed in an embodiment of the present invention.
Figure 4B:
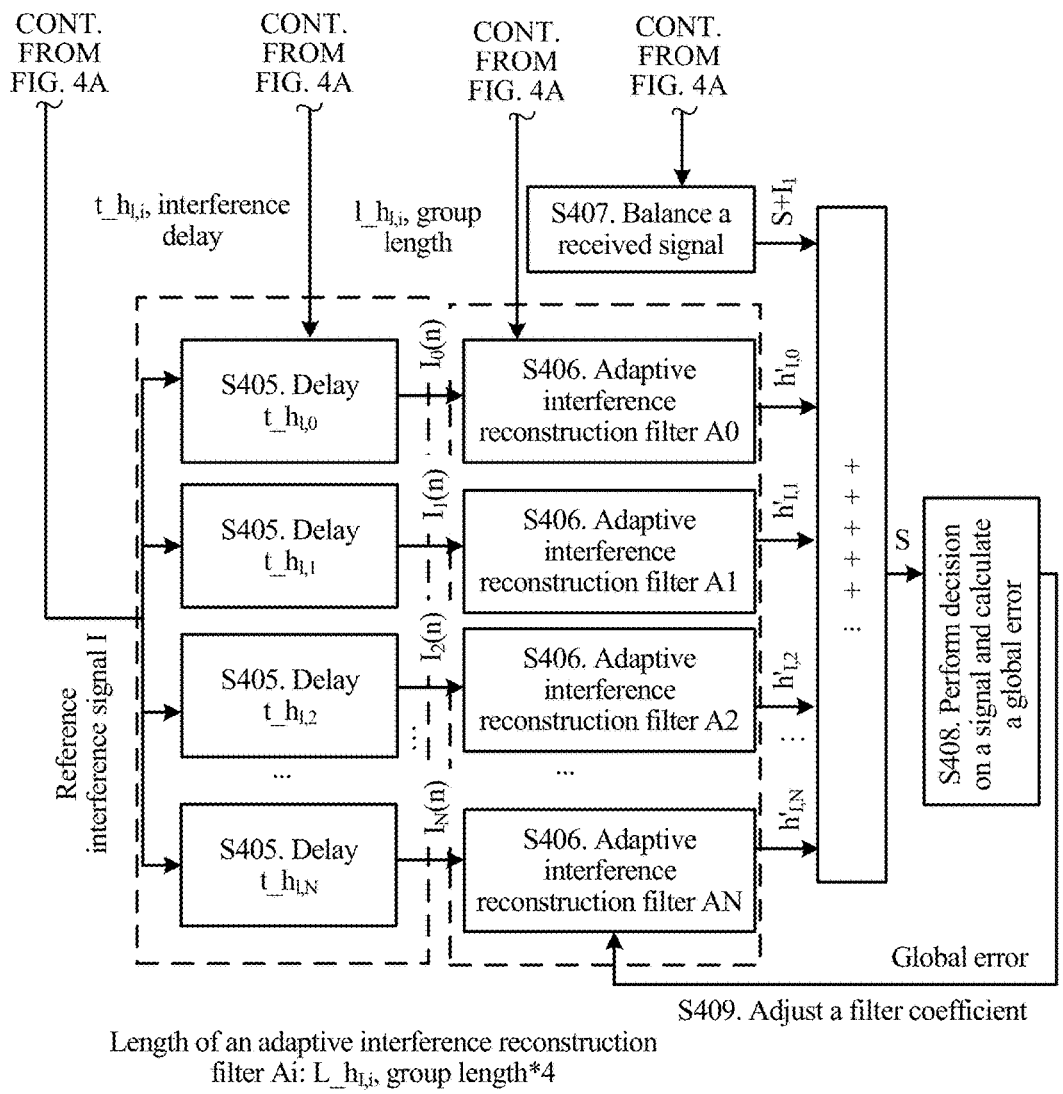

Referring to FIG. 4A and FIG. 4B, FIG. 4A and FIG. 4B are a schematic flowchart of another co-channel interference cancellation method disclosed in an embodiment of the present invention. A precondition for the co-channel interference cancellation method is that a wanted signal I transmitted by a local-end transmit antenna (the wanted signal I is an interference signal for a local-end receive antenna) causes co-channel interference (near-end interference and M far-end transmission interference) to a wanted signal S transmitted by a peer-end transmit antenna, and the co-channel interference may be represented by is an interference channel of each sub-interference in the co-channel interference, so that a signal r received by a local-end receive antenna=$S*h\_s+I*h_{I,0}+I*h_{I,1}+I*h_{I,2}+\ldots+I*h_{I,M}+n$. h_s is a channel used by the peer-end transmit antenna to send the wanted signal S to the local-end receive antenna, and n is other interference other than the co-channel interference. A formation process of the wanted signal I transmitted by the local-end transmit antenna may include the following steps: A signal source generates a source signal; operations such as M-tuple quadrature amplitude modulation and digital-to-analog conversion are performed on the source signal, and the source signal is modulated into the wanted signal I that can be transmitted by the local-end transmit antenna. The co-channel interference cancellation method may include the following steps.

S401. Start counting, by using a counter, from a first symbol that is used to send a preamble of a reference interference signal I and end counting until a frame header enabler appears after a received signal r and the preamble of the reference interference signal I are correlated, and determine a counting result of the counter as a reference delay of co-channel interference.

S402. Calculate a correlation between the received signal r and the preamble of the reference interference signal I, and generate the frame header enabler when a maximum correlation is calculated, where the frame header enabler is configured to make the counter stop counting.

S403. Obtain effective interference by filtering co-channel interference by using a preset interference strength threshold.

S404. Obtain a plurality of effective interference subgroups by grouping the effective interference, and determine an interference delay and a group length that are of each effective interference subgroup.

S405. Obtain a reference interference sub-signal of each effective interference subgroup by performing a parallel delay on the reference interference signal according to the interference delay of each effective interference subgroup.

S406. After each reference interference sub-signal separately passes through a corresponding adaptive interference reconstruction filter, obtain a reconstructed interference signal by overlaying each reference interference sub-signal.

S407. Balance the received signal r.

In this embodiment of the present invention, balancing the received signal r refers to separating the wanted signal S from the received signal $r=S*h\_s+I*h_{I,0}+I*h_{I,1}+I*h_{I,2}+\ldots+I*h_{I,M}+n$. Specifically, a convolution operation is performed on the received signal r and h, so that $S*h\_s*h$ is equal to S, that is, $h\_s*h=1$.

In this embodiment of the present invention, a signal $S+I_1$ is obtained after the received signal r is balanced, and $I_1=(I*h_{I,0}+I*h_{I,1}+I*h_{I,2}+\ldots+I*h_{I,M}+n)*h$. Then the wanted signal S is obtained after a difference (or summation) operation is performed on the signal $S+I_1$ and the reconstructed interference signal. That is, when the reconstructed interference signal and $I_1$ have equal amplitudes and inverted phases, a summation operation is performed on the signal $S+I_1$ and the reconstructed interference signal. When the reconstructed interference signal and $I_1$ have equal amplitudes and are in-phase signals, a subtraction operation is performed on the signal $S+I_1$ and the reconstructed interference signal.

S408. Obtain a wanted signal $S_1$ by performing decision on the wanted signal S, and calculate a difference (also referred to as a "global error") between the wanted signal S and the wanted signal $S_1$.

In this embodiment of the present invention, the wanted signal $S_1$ obtained by performing decision on the wanted signal S is a wanted signal $S_1$ that is determined according to the wanted signal S and that is closest to or the same as a signal transmitted by the peer-end transmit antenna.

S409. Adjust the filter coefficient of each adaptive interference reconstruction filter according to the global error.

It can be learned that by implementing this embodiment of the present invention, co-channel interference can be canceled while spectrum consumption is reduced, and implementation is simple and interference brought by channels with different channel lengths can be adaptively canceled, and a requirement on an estimation accuracy of the interference delay of each effective interference subgroup is not high.

Figure 5:
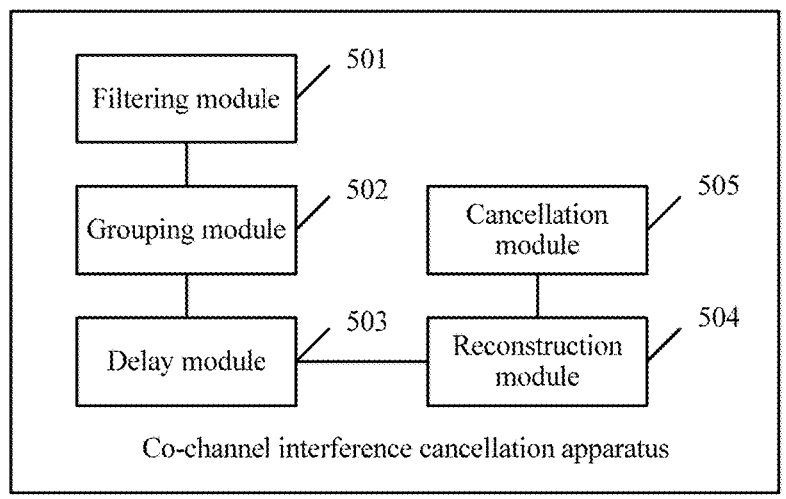
FIG. 5 is a schematic structural diagram of a co-channel interference cancellation apparatus disclosed in an embodiment of the present invention.

Referring to FIG. 5, FIG. 5 is a schematic structural diagram of a co-channel interference cancellation apparatus disclosed in an embodiment of the present invention. As shown in FIG. 5, the co-channel interference cancellation apparatus may include a filtering module 501, a grouping module 502, a delay module 503, a reconstruction module 504, and a cancellation module 505.

The filtering module 501 is configured to obtain effective interference by filtering co-channel interference according to a preset interference strength threshold.

In this embodiment of the present invention, after obtaining the effective interference through filtering, the filtering module 501 sends the effective interference to the grouping module 502.

The grouping module 502 is configured to obtain a plurality of effective interference subgroups by grouping the effective interference obtained by the filtering module 501 through filtering.

The delay module 503 is configured to obtain a reference interference sub-signal corresponding to the effective interference subgroup, by delaying a reference interference signal according to a determined interference delay of each effective interference subgroup.

The reconstruction module 504 is configured to: after each reference interference sub-signal passes through a corresponding adaptive interference reconstruction filter, obtain a reconstructed interference signal by overlaying each reference interference sub-signal.

The cancellation module 505 is configured to obtain a first wanted signal by performing a subtraction operation on a received signal and the reconstructed interference signal.

In an optional embodiment, a specific manner in which the filtering module 501 obtains the effective interference by filtering the co-channel interference according to the preset interference strength threshold may be:

determining, as the effective interference, co-channel interference obtained after an interference strength value of first target interference in the co-channel interference is set to zero, where the first target interference is interference that is in the co-channel interference and whose interference strength value is less than or equal to the preset interference strength threshold.

In this optional embodiment, further and optionally, a specific manner in which the grouping module 502 obtains the plurality of effective interference subgroups by grouping the effective interference may be:

determining second target interference in a target range interference as an effective interference subgroup, where the target range interference includes all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing an operation of determining the second target interference in the target range interference as an effective interference subgroup until the effective interference is grouped into a plurality of effective interference subgroups.

Figure 6:
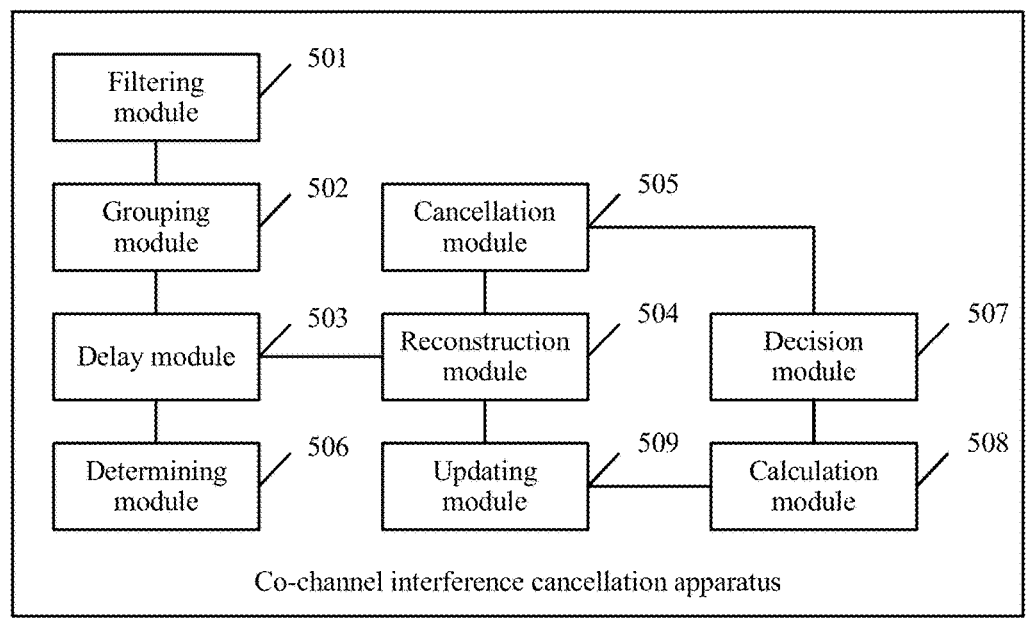
FIG. 6 is a schematic structural diagram of another co-channel interference cancellation apparatus disclosed in an embodiment of the present invention.

In another optional embodiment, the co-channel interference cancellation apparatus may further include a determining module 506, a decision module 507, a calculation module 508, and an updating module 509. In this case, a structure of the co-channel interference cancellation apparatus may be shown in FIG. 6, and FIG. 6 is a schematic structural diagram of another co-channel interference cancellation apparatus disclosed in an embodiment of the present invention.

The determining module 506 is configured to determine a reference delay of the co-channel interference before the filtering module 501 obtains the effective interference by filtering the co-channel interference according to the preset interference strength threshold. The reference delay is a counting result of counting from a first symbol that is used to send a preamble of the reference interference signal, until strongest interference with a maximum interference strength value is received. In this case, an interference delay of each effective interference subgroup is equal to a sum of a delay difference of the effective interference subgroup and the reference delay, and a delay difference of each effective interference subgroup is equal to a difference between a relative delay of the effective interference subgroup and a related delay of the strongest interference.

The decision module 507 is configured to obtain a second wanted signal by performing decision on the first wanted signal.

The calculation module 508 is configured to calculate a difference between the first wanted signal and the second wanted signal.

The updating module 509 is configured to update, according to the difference calculated by the calculation module 508, a filter coefficient that is of the adaptive interference reconstruction filter and that is corresponding to each reference interference sub-signal.

It can be learned that by implementing this embodiment of the present invention, co-channel interference can be canceled while spectrum consumption is reduced, and implementation is simple and interference brought by channels with different channel lengths can be adaptively canceled, and a requirement on an estimation accuracy of the interference delay of each effective interference subgroup is not high.

Figure 7:
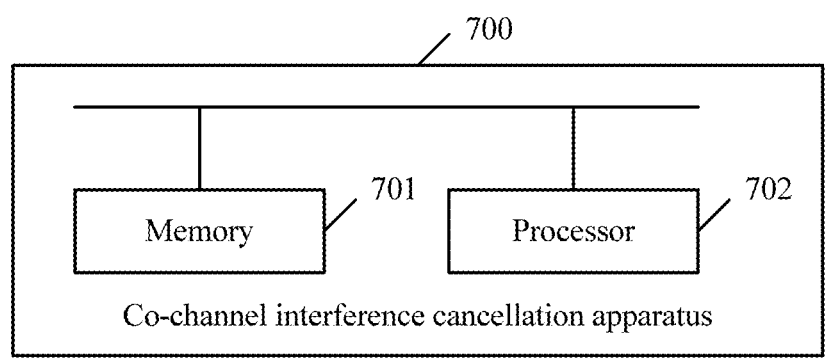
FIG. 7 is a schematic structural diagram of still another co-channel interference cancellation apparatus disclosed in an embodiment of the present invention.

Referring to FIG. 7, FIG. 7 is a schematic structural diagram of still another co-channel interference cancellation apparatus disclosed in an embodiment of the present invention. A co-channel interference cancellation apparatus 700 shown in FIG. 7 may include a memory 701 and a processor 702. The memory 701 stores a group of program code, and the processor 702 is configured to invoke the program code stored in the memory 701 to perform the following operations:

obtaining effective interference by filtering co-channel interference according to a preset interference strength threshold, and obtaining a plurality of effective interference subgroups by grouping the effective interference;

obtaining a reference interference sub-signal corresponding to the effective interference subgroup, by delaying a reference interference signal according to a determined interference delay of each effective interference subgroup;

after each reference interference sub-signal passes through a corresponding adaptive interference reconstruction filter, obtaining a reconstructed interference signal by overlaying each reference interference sub-signal; and obtaining a first wanted signal by performing a subtraction operation on a received signal and the reconstructed interference signal.

In an optional embodiment, a specific manner in which the processor 702 obtains the effective interference by filtering the co-channel interference according to the preset interference strength threshold is:

determining, as the effective interference, co-channel interference obtained after an interference strength value of first target interference in the co-channel interference is set to zero, where the first target interference is interference that is in the co-channel interference and whose interference strength value is less than or equal to the preset interference strength threshold.

In this optional embodiment, further and optionally, a specific manner in which the processor 702 obtains the plurality of effective interference subgroups by grouping the effective interference may be:

determining second target interference in a target range interference as an effective interference subgroup, where the target range interference includes all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing an operation of determining the second target interference in the target range interference as an effective interference subgroup until the effective interference is grouped into a plurality of effective interference subgroups.

In another optional embodiment, before the processor 702 obtains the effective interference by filtering the co-channel interference according to the preset interference strength threshold, the processor 702 invokes the program code stored in the memory 701 to further perform the following operation:

determining a reference delay of the co-channel interference, where the reference delay is a counting result of counting from a first symbol that is used to send a preamble of the reference interference signal, until strongest interference with a maximum interference strength value is received.

An interference delay of each effective interference subgroup is equal to a sum of a delay difference of the effective interference subgroup and the reference delay, and a delay difference of each effective interference subgroup is equal to a difference between a relative delay of the effective interference subgroup and a related delay of the strongest interference.

In still another optional embodiments, the processor 702 invokes the program code stored in the memory 701 to further perform the following operations:

obtaining a second wanted signal by performing decision on the first wanted signal;

calculating a difference between the first wanted signal and the second wanted signal; and updating, according to the difference, a filter coefficient that is of the adaptive interference reconstruction filter and that is corresponding to each reference interference sub-signal.

It can be learned that by implementing this embodiment of the present invention, co-channel interference can be canceled while spectrum consumption is reduced, and implementation is simple and co-channel interference brought by channels with different channel lengths can be adaptively canceled, and a requirement on an estimation accuracy of the interference delay of each effective interference subgroup is not high.

It should be noted that, in the foregoing embodiments, the description of each embodiment has respective focuses. For a part that is not described in detail in an embodiment, refer to related descriptions in other embodiments. In addition, a person skilled in the art should also appreciate that all the embodiments described in the specification are example embodiments, and the related actions and modules are not necessarily mandatory to the present invention.

A sequence of the steps of the method in the embodiments of the present invention may be adjusted, and certain steps may also be merged or removed according to an actual need.

The modules in the apparatus in the embodiments of the present invention may be combined, divided, or deleted according to an actual requirement.

The modules of the embodiments of the present invention may be executed by a universal integrated circuit, such as a CPU (Central Processing Unit) or an ASIC (Application Specific Integrated Circuit).

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a Read-Only Memory (ROM), a Random Access Memory (RAM), or the like.

The co-channel interference cancellation method and apparatus provided in the embodiments of the present invention are described in detail above. Specific examples are used in the specification to illustrate the principle and implementations of the present invention. The foregoing embodiments are described merely to help understand the method and core ideas of the present invention. In addition, for a person of ordinary skill in the art, on the basis of the idea of the present invention, a modification may be made to the specific implementation and the application range. In conclusion, the content of the specification shall not be construed as a limit to the present invention.

What is claimed is:

1. A co-channel interference cancellation method, comprising:

obtaining effective interference by filtering co-channel interference according to a preset interference strength threshold, and obtaining a plurality of effective interference subgroups by grouping the effective interference;

obtaining a reference interference sub-signal corresponding to each effective interference subgroup, by delaying a reference interference signal according to a determined interference delay of each effective interference subgroup;

after each reference interference sub-signal passes through a corresponding adaptive interference reconstruction filter, obtaining a reconstructed interference signal by overlaying each reference interference sub-signal; and obtaining a first wanted signal by performing a subtraction operation on a received signal and the reconstructed interference signal.

2. The method according to claim 1, wherein the obtaining the effective interference by filtering the co-channel interference according to the preset interference strength threshold comprises:

determining, as the effective interference, co-channel interference obtained after an interference strength value of first target interference in the co-channel interference is set to zero, wherein the first target interference is interference that is in the co-channel interference and whose interference strength value is less than or equal to the preset interference strength threshold.

3. The method according to claim 1, wherein before the obtaining the effective interference by filtering the co-channel interference according to the preset interference strength threshold, the method further comprises:

determining a reference delay of the co-channel interference, wherein the reference delay is a counting result from counting a first symbol that is used to send a preamble of the reference interference signal, until strongest interference with a maximum interference strength value is received, wherein an interference delay of each effective interference subgroup is equal to a sum of a delay difference of each effective interference subgroup and the reference delay, and the delay difference of each effective interference subgroup is equal to a difference between a relative delay of each effective interference subgroup and a related delay of the strongest interference.

4. The method according to claim 2, wherein the obtaining the plurality of the effective interference subgroups by grouping the effective interference comprises:

determining second target interference in a target range interference as an effective interference subgroup, wherein the target range interference comprises all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing the determination of the second target interference in the target range interference as the effective interference subgroup until the effective interference is grouped into the plurality of effective interference subgroups.

5. The method according to claim 1, further comprising:
obtaining a second wanted signal by performing a decision on the first wanted signal;
obtaining a difference between the first wanted signal and the second wanted signal; and
updating, according to the difference, a filter coefficient that is of the corresponding adaptive interference reconstruction filter and that corresponds to each reference interference sub-signal.

6. A non-transitory computer readable medium, comprising processor-executable instructions, which when executed by a processor causes the processor to implement operations including:
obtaining effective interference by filtering co-channel interference according to a preset interference strength threshold;
obtaining a plurality of effective interference subgroups by grouping the effective interference;
obtaining a reference interference sub-signal corresponding to each effective interference subgroup, by delaying a reference interference signal according to a determined interference delay of each effective interference subgroup;
after each reference interference sub-signal passes through a corresponding adaptive interference reconstruction filter, obtaining a reconstructed interference signal by overlaying each reference interference sub-signal; and
obtaining a first wanted signal by performing a subtraction operation on a received signal and the reconstructed interference signal.

7. The non-transitory computer readable medium according to claim 6, wherein the operation of obtaining the effective interference by filtering the co-channel interference according to the preset interference strength threshold includes:
determining, as the effective interference, co-channel interference obtained after an interference strength value of first target interference in the co-channel interference is set to zero, wherein the first target interference is interference that is in the co-channel interference and whose interference strength value is less than or equal to the preset interference strength threshold.

8. The non-transitory computer readable medium according to claim 6, wherein the operations further include:

determining a reference delay of the co-channel interference before obtaining the effective interference by filtering the co-channel interference according to the preset interference strength threshold, wherein the reference delay is a counting result from counting a first symbol that is used to send a preamble of the reference interference signal, until strongest interference with a maximum interference strength value is received, wherein an interference delay of each effective interference subgroup is equal to a sum of a delay difference of each effective interference subgroup and the reference delay, and the delay difference of each effective interference subgroup is equal to a difference between a relative delay of each effective interference subgroup and a related delay of the strongest interference.

9. The non-transitory computer readable medium according to claim 7, wherein the operation of obtaining the plurality of effective interference subgroups by grouping the effective interference includes:
determining second target interference in a target range interference as an effective interference subgroup, wherein the target range interference comprises all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and
determining, as a next current interference, first interference that follows the target range interference and whose interference strength value is greater than zero, and performing the determination of the second target interference in the target range interference as the effective interference subgroup until the effective interference is grouped into the plurality of effective interference subgroups.

10. The non-transitory computer readable medium according to claim 6, wherein the operation further includes:
obtaining a second wanted signal by performing a decision on the first wanted signal;
obtaining a difference between the first wanted signal and the second wanted signal; and
updating, according to the difference, a filter coefficient that is of the corresponding adaptive interference reconstruction filter and that corresponds to each reference interference sub-signal.

11. A co-channel interference cancellation apparatus, comprising a memory and a processor, wherein the memory stores a group of program code, and the processor is configured to execute the program code stored in the memory to perform the following operations:
obtaining effective interference by filtering co-channel interference according to a preset interference strength threshold, and obtaining a plurality of effective interference subgroups by grouping the effective interference;
obtaining a reference interference sub-signal corresponding to each effective interference subgroup, by delaying a reference interference signal according to a determined interference delay of each effective interference subgroup;

after each reference interference sub-signal passes through a corresponding adaptive interference reconstruction filter, obtaining a reconstructed interference signal by overlaying each reference interference sub-signal; and obtaining a first wanted signal by performing a subtraction operation on a received signal and the reconstructed interference signal.

12. The apparatus according to claim 11, wherein the operation of obtaining the effective interference by filtering the co-channel interference according to the preset interference strength threshold includes:

determining, as the effective interference, co-channel interference obtained after an interference strength value of first target interference in the co-channel interference is set to zero, wherein the first target interference is interference that is in the co-channel interference and whose interference strength value is less than or equal to the preset interference strength threshold.

13. The apparatus according to claim 11, wherein before the processor obtains the effective interference by filtering the co-channel interference according to the preset interference strength threshold, the processor executes the program code stored in the memory to further perform the following operation:

determining a reference delay of the co-channel interference, wherein the reference delay is a counting result from counting a first symbol that is used to send a preamble of the reference interference signal, until strongest interference with a maximum interference strength value is received, wherein an interference delay of each effective interference subgroup is equal to a sum of a delay difference of each effective interference subgroup and the reference delay, and the delay difference of each effective interference subgroup is equal to a difference between a relative delay of each effective interference subgroup and a related delay of the strongest interference.

14. The apparatus according to claim 12, wherein the operation of obtaining the plurality of effective interference subgroups by grouping the effective interference includes:

determining second target interference in a target range interference as an effective interference subgroup, wherein the target range interference comprises all interference that is in the effective interference and that is started with current interference with an interference strength value greater than zero and ended with continuously appearing interference whose quantity is greater than a preset quantity and whose interference strength value is zero, and the second target interference is interference before the interference that is in the target range interference and whose quantity is greater than the preset quantity and whose interference strength value is zero; and determining, as a next current interference, first interference that follows the target range interference and whose interference strength value is greater than zero, and performing the determination of the second target interference in the target range interference as the effective interference subgroup until the effective interference is grouped into the plurality of effective interference subgroups.

15. The apparatus according to claim 11, wherein the processor executes the program code stored in the memory to further perform the following operations:

obtaining a second wanted signal by performing a decision on the first wanted signal;

obtaining a difference between the first wanted signal and the second wanted signal; and updating, according to the difference, a filter coefficient that is of the corresponding adaptive interference reconstruction filter and that corresponds to each reference interference sub-signal.

* * * * *